United States Patent [19]

Poling, Sr.

[11] Patent Number: 5,323,646
[45] Date of Patent: Jun. 28, 1994

[54] FRICTIONLESS CARRIAGE FOR TIRE UNIFORMITY MACHINE LOADWHEEL CARRIAGE

[75] Inventor: David L. Poling, Sr., Akron, Ohio

[73] Assignee: Akron Special Machinery, Inc., Akron, Ohio

[21] Appl. No.: 935,264

[22] Filed: Aug. 27, 1992

[51] Int. Cl.⁵ .......................................... G01M 17/02
[52] U.S. Cl. ........................................... 73/146; 73/8
[58] Field of Search ................ 73/8, 146, 146.2, 146.5

[56] References Cited

U.S. PATENT DOCUMENTS

| | | | |
|---|---|---|---|
| 4,458,526 | 7/1984 | Doi et al. | 73/146 |
| 4,704,900 | 11/1987 | Beebe | 73/146 |
| 4,829,815 | 5/1989 | Kuzas | 73/146 |
| 4,949,574 | 8/1990 | Lindén et al. | 73/8 |
| 4,986,119 | 1/1991 | Gicewicz | 73/146 |

OTHER PUBLICATIONS

Schneeberger Anti-friction Guideways Catalog, Edition 100g/05, undated.

Primary Examiner—Donald O. Woodiel
Assistant Examiner—William L. Oen
Attorney, Agent, or Firm—Reese Taylor

[57] ABSTRACT

In a tire uniformity machine of the type wherein a loadwheel is received on a carriage slidably mounted on the machine frame for movement toward and away from the tire, the frame and the carriage are interconnected by mounting plates, one attached to the frame and one attached to the carriage, and interconnected by precision anti-friction flatway linear motion bearings of the type characterized by cross rollers or balls mounted in anti-friction ways so as to facilitate movement of the carriage and stability thereof in two axes to insure precise positioning of the loadwheel relatively of the tire.

5 Claims, 3 Drawing Sheets

FRICTIONLESS CARRIAGE FOR TIRE UNIFORMITY MACHINE LOADWHEEL CARRIAGE

BACKGROUND OF THE INVENTION

This invention relates in general to tire uniformity machines and relates in particular to a frictionless carriage mounting for the loadwheel of such machines.

DESCRIPTION OF THE PRIOR ART

Tire uniformity machines and their use and function in the production and testing of vehicle tires are well-known in the art. An example of such a tire uniformity machine can be seen in Beebe U.S. Pat. No. 4,704,900.

As part of the overall testing and inspection program conducted in connection with the production of pneumatic tires, a tire uniformity machine is commonly utilized to take measurements characterizing the uniformity of the tire. This is essentially accomplished by measuring the nature of certain forces generated by the tire as it rolls or is rotated along a surface.

In general, the typical tire uniformity machine includes a frame and a chucking mechanism mounted on the frame for engaging the tires to be tested which are moved into and out of the machine on associated conveyors. Inflation means for inflating the tire to a predetermined internal pressure and means for rotating the chucking mechanism and the tire are also provided. A rotatable loadwheel is mounted on the frame so as to be movable into and out of contact with the periphery or tread of the tire to simulate the actual forces which would be encountered by the tire under operating conditions on a vehicle.

Various pieces of instrumentation are connected to the loadwheel so as to obtain the desired information and measurements concerning the reaction characteristics of the tire during the testing cycle.

Accuracy and speed of operation are important requirements for such machines inasmuch as one object is to insure safe, high quality tires and another is to test the tires on a more or less continuous basis.

It will be readily apparent that, in order to insure the accuracy of the measurements, the loadwheel must be precisely positioned as it is brought into contact with the tire. In the prior art, the loadwheel which is mounted on a carriage is moved toward and away from the tire along gibbing or ways which, while substantially effective, do not provide the requisite, precise positioning. This gibbing must be held to close tolerances and is subject to wear, damage and accumulations of foreign material, all of which can affect the positioning of the loadwheel relative to the time and the ease with which the carriage traverses the gibbing.

SUMMARY OF THE INVENTION

It is, accordingly, a principal object of this invention to provide a frictionless, smoothly operating, precision positioning means for moving the loadwheel carriage into and out of contact with the tire during the testing operation. To that end, it has been found that the utilization of precision anti-friction flatway linear motion bearings between the carriage and the machine will insure accurate movement and positioning. This and other objects will become more apparent upon a reading of the following brief specification considered and interpreted in view of the accompanying drawings.

BRIEF DESCRIPTION OF THE PREFERRED EMBODIMENTS

Figure 1:
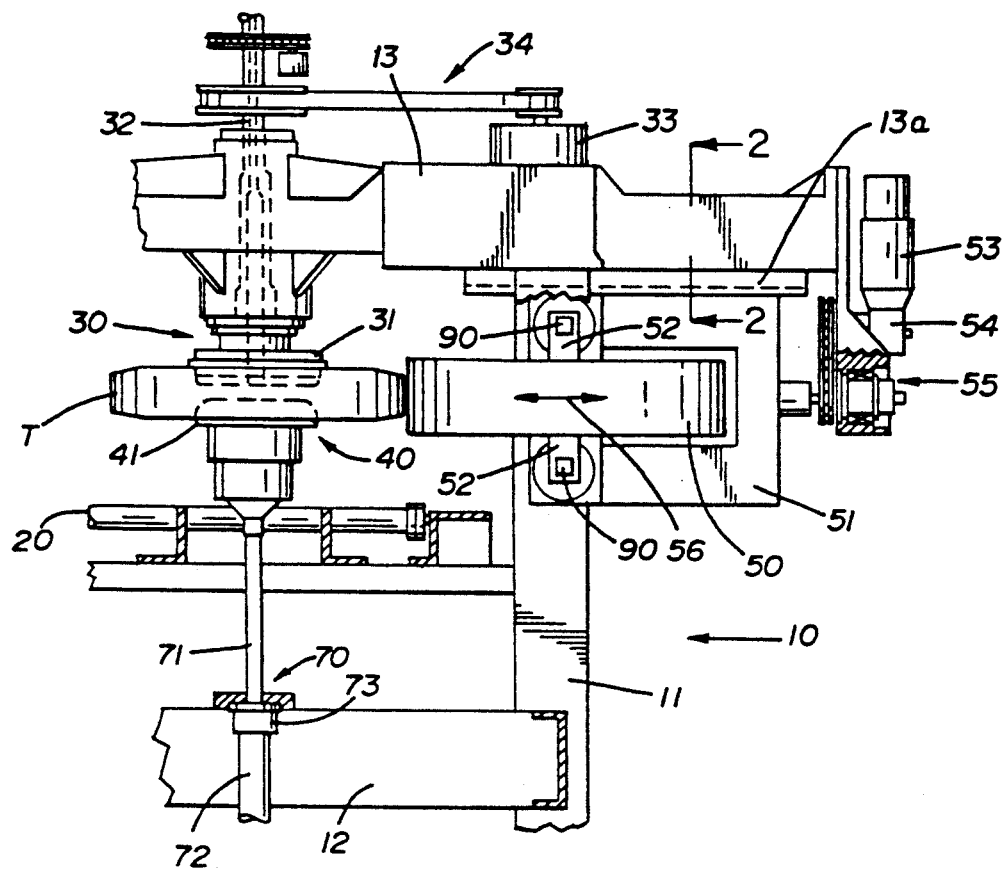
FIG. 1 is an elevational view, partially in section and partially schematic, showing a typical tire uniformity machine.

Referring first to FIG. 1 for a general description of the tire uniformity machine which is generally indicated by the numeral 10, it will be noted that vertical side frame members 11,11 and horizontal top and bottom frame members 12 and 13 form a framework for the machine, creating generally a box-like structure within which the tire is received and tested.

In that regard, the upper frame members 13,13 carry the upper chuck assembly 30 which includes the chuck 31 and a spindle 32 used to rotate the upper chuck assembly 30 during the testing operation.

In that regard, the spindle 32 of the upper chuck assembly 30 is driven by a motor 33 connected to the spindle by a belt or chain drive 34 for rotational purposes.

A lower chuck assembly 40, including a chuck 41, is also mounted on lower frame members 12,12 and is supported on a shaft 71 which is attached to a hydraulic unit 70 which includes a piston 73 and cylinder 72 so that the lower chuck assembly can be elevated and lowered or, in other words, moved toward or away from the upper chuck assembly 30 so that the tire T can be chucked between the upper and lower chuck assemblies for testing purposes after being moved into the machine along conveyor 20.

A loadwheel 50 is also provided and is carried by a carriage 51 which is mounted on the frame. The loadwheel 50 is rotatably mounted on spindles 52,52 and the spindles have associated with them load cells 90,90 which are used to measure certain characteristics of the tire, as will be explained.

The carriage 51 is movable toward and away from the tire T in the direction of the arrow 56 by means of the motor 53, gear reduction unit 54 and drive means 55.

All of this structure is essentially conventional in nature and is not described or illustrated in great detail herein since it would be well within the knowledge of one reasonably skilled in this art.

For purposes of the present invention, it is sufficient to note that, with the lower chuck assembly 40 in its retracted position, the tire T may be moved into registry with the lower chuck 41 along conveyor 20. The lower chuck assembly 40 is then elevated so that the tire T engages chuck 31 of upper chuck assembly 30 to firmly seat the tire. The tire is then inflated to the desired inflation pressure by suitable inflation means (not shown) and rotated by motor 33. Loadwheel 50 can then be moved into engagement with the tire to perform the testing procedure. It will be appreciated that it is essential that the face of the loadwheel which engages the tire be precisely positioned to insure accurate measurements.

Figure 2:
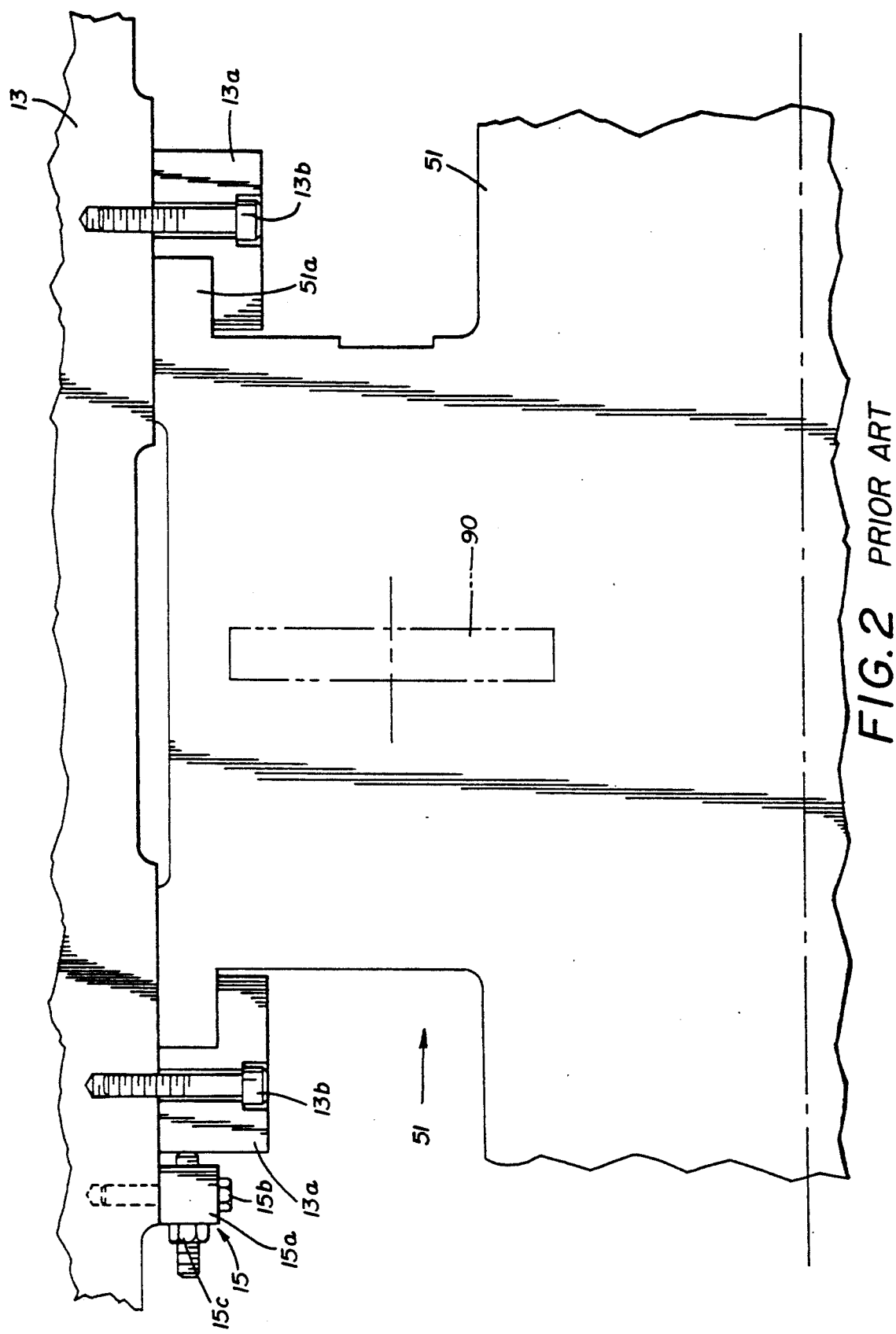
FIG. 2 is a sectional view, taken along the line 2—2 of FIG. 1, showing the conventional prior art gibbing system for the carriage of the loadwheel.

Turning to FIG. 2 of the drawings for a further description of the prior art, it will be seen that a loadwheel carriage or casting 51 of conventional design generally includes a T-shaped top member 51a. The upper casting or frame members 13,13 of the tire uniformity machine 10 receive or constitute gibs or ways 13a,13a which are secured to the underside thereof by a plurality of screws 13b,13b. As can be seen, the gibs or ways 13a,13a are generally L-shaped in cross-section to provide an elongate support surface. The head of T-shaped top member 51a of the carriage 51 is received on these support surfaces of members 13a,13a and slid therealong to bring loadwheel 50 into and out of contact with the tire. Preload adjustment means are also usually provided and are generally indicated by the numeral 15. These include an elongate bar 15a disposed along the outer edge of one of gibs or ways 13a and secured to the casting 13 by means of one or more screws 15b. One or more adjustment set screws 15c are also threaded through mounting cube 15a and bear against the outer wall of gib or way 13a so as to provide for preload adjustment of the way or gib to assure longitudinal alignment thereof.

The load cell 90 is, of course, also provided in the conventional arrangement for measurement purposes.

Figure 3:
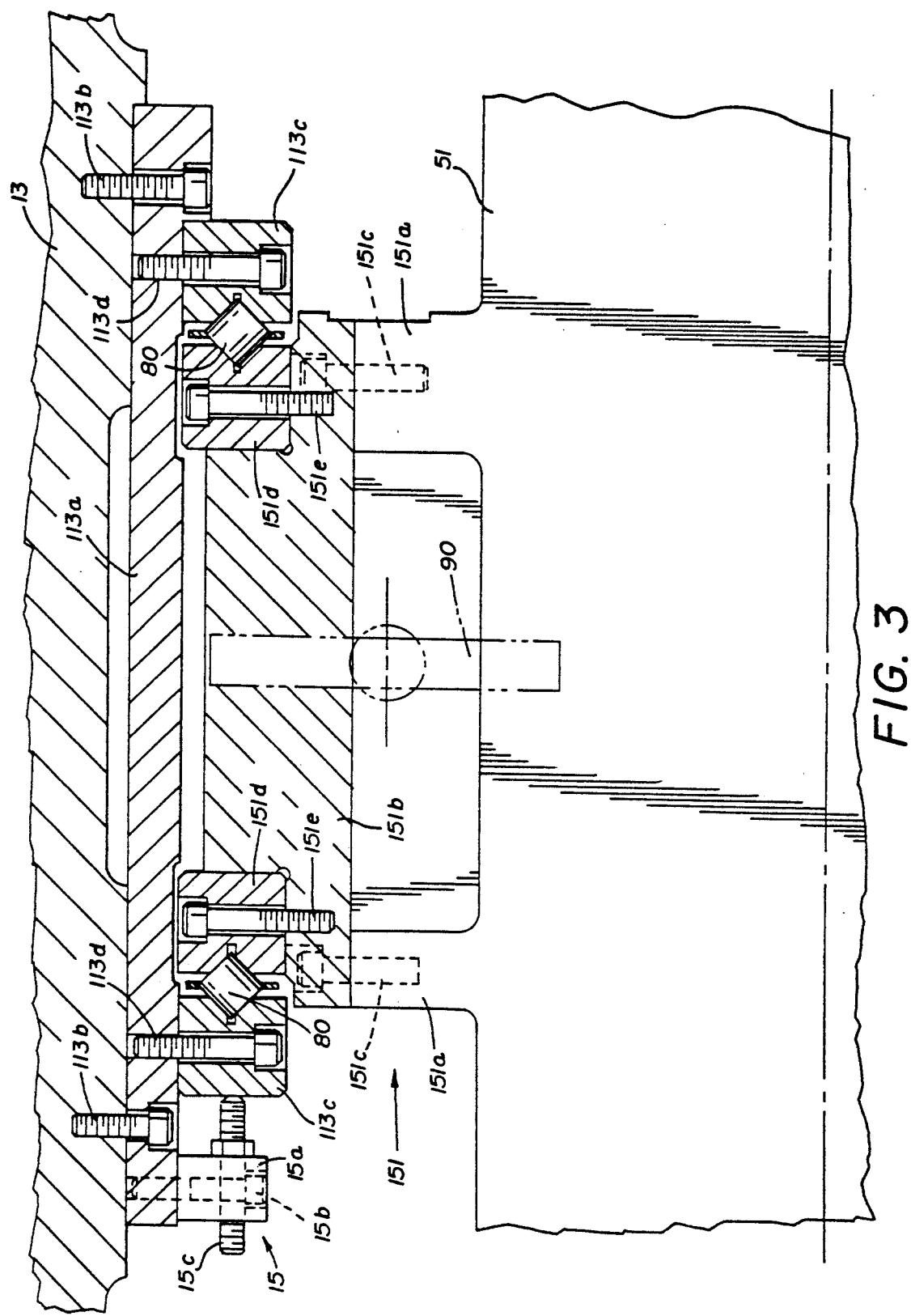
FIG. 3 is a view similar to FIG. 2 showing the improved carriage mechanism of the present invention.

Turning then to FIG. 3 of the drawings for a description of the present invention, it will be seen that an improved arrangement is provided for moving the carriage 51.

Here again, the main head or casting 13 is provided, but here it receives an elongate first mounting plate 113a secured to the underside thereof by screws 113b,113b.

The usual preload adjustment means 15 is then mounted to this plate by means of the screws 15b and adjustment set screws 15c operate in a similar fashion to the version shown in FIG. 2 of the drawings to align mounting plate 113a.

In the present invention, moreover, the carriage 151 is modified by providing upstanding legs 151a,151a which are secured to a second mounting plate 151b by screws 151c,151c. The second mounting plate 151b is, in turn, secured to bearing guideways 151d,151d by screws 151e,151e. Further bearing guideways 113c,113c are secured to the first mounting plate 113a by screws 113d,113d, with bearing 80 being received between the guideways 151d and 113c. An example of the precision anti-friction flatway linear motion bearing of a type suitable for use in this invention are elongate, linear type bearings of the type RNG produced by Schneeberger, Inc., 7 DeAngelo Drive, Bedford, Mass. which are of the type with cross rollers or balls for anti-friction guide ways. Such bearings provide easy, play-free motion over the whole stroke of the carriage and great accuracy of movement.

Figure 4:
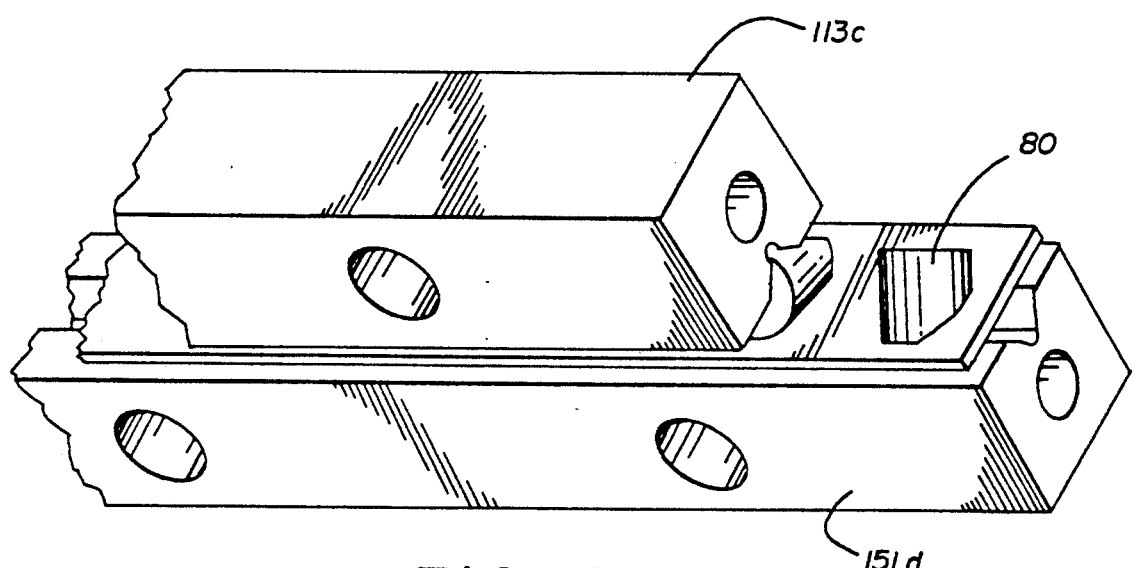
FIG. 4 is a perspective view of a typical bearing unit used in the present invention.

FIG. 4 illustrates such a bearing having flatways 113c and 151d and cross axis rollers 81. Other similar precision anti-friction flatway linear motion bearings having similar advantages and characteristics can also be employed, FIG. 4 merely illustrating one example.

In this fashion, it will be readily seen that very precise adjustment and control of the position of loadwheel 50 can be achieved inasmuch as such an arrangement provides stability in two axes and yet the frictionless nature of the support provided by the bearings 80 and the ways 113c and 151d insure quick, easy and ready precise movement and positioning of the carriage 51 and, thus, the loadwheel 50 to insure precise orientation of the contact surface of the loadwheel with respect to the tire.

It will be apparent that such an arrangement avoids the imprecision common in the prior art use of gibbing or even ball bushings in this context.

While a full and complete description of the invention has been set forth in accordance with the dictates of the Patent Statutes, it should be understood that modifications can be resorted to without departing from the spirit hereof or the scope of the appended claims.

Thus, in addition to providing an improved loadwheel carriage support as original equipment, it will be appreciated that existing machines can be easily retrofit by replacing gibbing 13a,13a with plate 113a, modifying the carriage as shown in FIG. 3 and interposing the bearings 80 therebetween.

What is claimed is:

1. In a tire uniformity machine having a framework for receiving and rotating a tire and a loadwheel mounted on a carriage and driven linearly along the framework and radially of the tire toward and away from the tire, the improvement comprising:
    a) a first elongate mounting plate attached to the framework and extending along the path of movement of the carriage;
    b) a second elongate mounting plate attached to the carriage;
    c) anti-friction means attached to and interconnecting said first and second mounting plates; and
    d) said anti-friction means including parallel bearing ways attached to said first and second mounting plates and extending therealong.

2. The improvement in claim 1 wherein said anti-friction means include linear bearings including cross rollers or balls loaded in skid ways.

3. The improvement of claim 1 wherein a first elongate bearing way is attached to said first mounting plate; and a second elongate bearing way is attached to said second mounting plate.

4. The improvement of claim 1 wherein said first mounting plate has opposed, elongate edge surfaces; and adjustment means are mounted to the framework adjacent to and extending along one said elongate edge surface for engagement with said anti-friction means.

5. The improvement of claim 3 wherein the carriage includes opposed, upwardly projecting legs; said legs being connected to said second mounting plate and having recesses in their distal ends for receipt of said second bearing way.

* * * * *